US012175634B2

(12) United States Patent
Godlieb

(10) Patent No.: US 12,175,634 B2
(45) Date of Patent: Dec. 24, 2024

(54) MIRROR ASSEMBLY

(71) Applicant: KONINKLIJKE PHILIPS N.V., Eindhoven (NL)

(72) Inventor: Robert Godlieb, Drachten (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 45 days.

(21) Appl. No.: 17/288,681

(22) PCT Filed: Dec. 17, 2019

(86) PCT No.: PCT/EP2019/085545
§ 371 (c)(1),
(2) Date: Apr. 26, 2021

(87) PCT Pub. No.: WO2020/127195
PCT Pub. Date: Jun. 25, 2020

(65) Prior Publication Data
US 2021/0398251 A1 Dec. 23, 2021

(30) Foreign Application Priority Data
Dec. 19, 2018 (EP) .................................... 18214197

(51) Int. Cl.
G06T 5/70 (2024.01)
A45D 44/00 (2006.01)
(Continued)

(52) U.S. Cl.
CPC .............. *G06T 5/70* (2024.01); *A45D 44/005* (2013.01); *A47G 1/02* (2013.01); *G01J 1/4204* (2013.01); *G06F 3/012* (2013.01); *G06F 3/013* (2013.01)

(58) Field of Classification Search
CPC ............ G02B 30/27; G02B 2027/0136; G02B 2027/0187; G06F 3/0325; G06F 3/012;
(Continued)

(56) References Cited

U.S. PATENT DOCUMENTS 7,562,985 B2   7/2009   Cortenraad
7,978,883 B2   7/2011   Rouh
(Continued)

FOREIGN PATENT DOCUMENTS

CN   111226187 A  *  6/2020  .............. A47F 11/06
EP   3301543         4/2018
(Continued)

OTHER PUBLICATIONS

International Search Report and Written Opinion Dated Feb. 19, 2020 For International Application No. PCT/EP2019/085545 Filed Dec. 17, 2019.
(Continued)

*Primary Examiner* — Weiming He

(57) ABSTRACT

A mirror assembly (100) comprising: a reflective portion (110) configured to reflect incident light; a display unit (120) arranged to overlap the reflective portion, wherein the display unit is configured to display at least one of a visual element and a blurred effect element; and a control unit (130). The control unit (130) is configured to: receive instruction to display a visual element or instruction to display a blurred effect element; determine, based on the received instruction, a blur region for the visual element or a motion trajectory of the blurred effect element, wherein the blur region or the blurred effect element is larger than a display resolution of the display unit; and control the display unit to display the visual element with the determined blur region or to display the blurred effect element in the determined motion trajectory in a field of view of a user.

15 Claims, 11 Drawing Sheets

(51) Int. Cl.
*A47G 1/02* (2006.01)
*G01J 1/42* (2006.01)
*G06F 3/01* (2006.01)

(58) Field of Classification Search
CPC ........... G06F 3/013; G06T 11/00; G06T 5/70; A47G 2001/002; A47G 1/02; A45D 44/005
See application file for complete search history.

(56) References Cited

U.S. PATENT DOCUMENTS

| | | |
|---|---|---|
| 2012/0206782 A1 | 8/2012 | Chan |
| 2013/0050432 A1 | 2/2013 | Perez |
| 2013/0182005 A1 | 7/2013 | Fretwell |
| 2015/0145882 A1 | 5/2015 | Nguyen |
| 2016/0019868 A1 | 1/2016 | Park |
| 2016/0112627 A1* | 4/2016 | Ono ..................... H04N 23/672 382/255 |
| 2016/0269713 A1 | 9/2016 | Kasumi |
| 2016/0358582 A1 | 12/2016 | Lee |
| 2017/0199311 A1 | 7/2017 | Sakai |
| 2019/0014262 A1* | 1/2019 | Yamaguchi ........... G01B 11/026 |
| 2019/0102056 A1* | 4/2019 | Sabater ................. G06F 3/0484 |

FOREIGN PATENT DOCUMENTS

| | | |
|---|---|---|
| JP | 3779620 B2 * | 5/2006 |
| JP | 2017221364 A | 12/2017 |
| JP | 2017224130 A | 12/2017 |
| WO | 2005031552 | 4/2005 |
| WO | 2014103088 | 7/2014 |
| WO | 2014167831 A1 | 10/2014 |
| WO | 2015008164 | 1/2015 |
| WO | 2017108703 | 6/2017 |

OTHER PUBLICATIONS

Held, et al: "Blur and Disparity Are Complementary Cues to Depth", Current Biology 22, 426-431, Mar. 6, 2012.

* cited by examiner

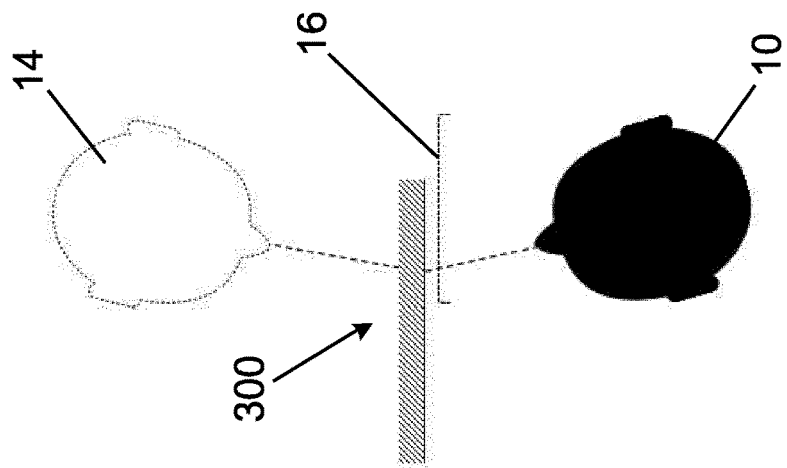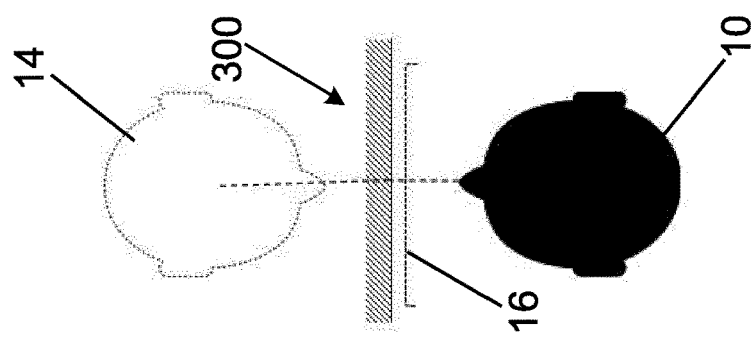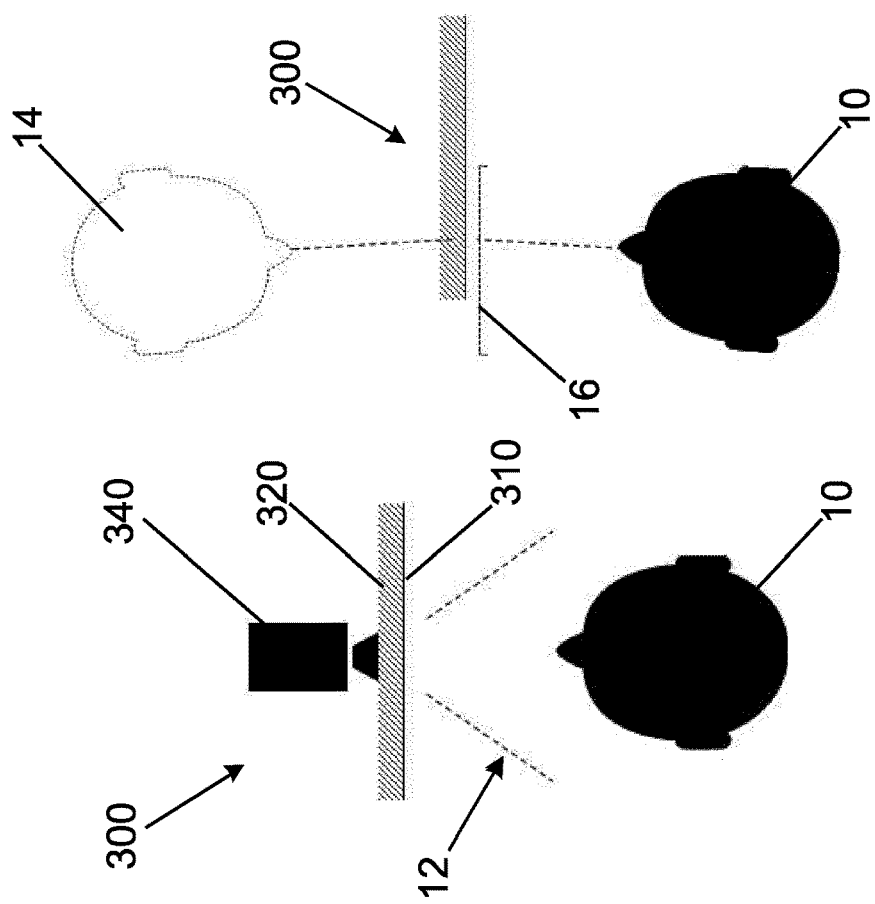
Fig. 4D  Fig. 4C  Fig. 4B  Fig. 4A

MIRROR ASSEMBLY

CROSS REFERENCE TO RELATED APPLICATIONS

This application is the U.S. National Phase application under 35 U.S.C. § 371 of International Application No. PCT/EP2019/085545 filed Dec. 17, 2019, which claims the benefit of European Patent Application Number 18214197.8 filed Dec. 19, 2018. These applications are hereby incorporated by reference herein.

FIELD OF THE INVENTION

The present disclosure relates to a mirror assembly that can be used for supporting a user in performing a personal care activity, and a method for displaying at least one of a visual element and a blurred effect element at a display unit of a mirror assembly.

BACKGROUND OF THE INVENTION

A user performing a personal care activity can often benefit from being assisted during the personal care activity. For example, some smart mirrors provide an opportunity to add extra visual information to be displayed in addition to a reflection (or a representation of a scene, if a display is being used to approximate a mirror). This can be useful since people often perform various personal care activities in front of a mirror.

For example, personal care activities performed in front of a mirror can include personal health activities (which may be monitored to study the health of the user performing the personal health activity), personal hygiene activities (for example, tooth care activities such as cleaning, brushing, or flossing teeth, or skin care activities such as treating or cleansing skin), and personal grooming activities (for example, removing hair such as cutting hair or shaving hair on any part of their body, or brushing or straightening hair). The smart mirror can therefore be used in conjunction with a number of different personal care devices, such as a weighing scale, an electric shaver, a skin hydration sensor, an electric toothbrush or a skin cleansing brush. The visual information provided by smart mirrors can directly enhance and support these personal care activities. Specifically, the user interface provided by the smart mirrors allow an elevated experience of using a respective personal care device (e.g. an electric toothbrush or an electric shaver) which leads to improved user-friendliness of the personal care apparatus. The visual information provided by smart mirrors is typically displayed directly behind or on a mirror (reflective) surface.

During use of a smart mirror, the position of the reflection of the user's face as viewed on the surface of the mirror is the perpendicular projection of the face perceived to lie at an equal distance behind the mirror, while the position of the information displayed at the smart mirror is typically located directly behind the mirror surface. Hence, the focal distance for viewing a reflective image in this case is approximately twice the focal distance for viewing the displayed information at the smart mirror. The difference in focal distances and accordingly different depths in field of view would trigger the user's gaze to refocus between the reflective image and the displayed information which are both in the field of view of the user. This continuous refocusing by the user would cause unnecessary eye fatigue and would potentially distract the user from performing a personal care activity (e.g. shaving). Also, since the shift of focus occurs subconsciously, it would require actual effort by the user to suppress it. Accordingly, some currently available smart mirror systems are configured to displaying information away from an area which corresponds to the reflective image of the user so as to avoid trigger user refocusing. Also, some currently available smart mirror systems circumvent this issue by displaying a modified image of the user's face at the smart mirror (at the display focal distance) and thereby completely drawing the user's gaze away from their reflective image.

It is to be noted that EP patent application EP 3 301 543 A1 discloses a smart mirror device having a display with adjustable reflectivity to obtain the visual effect of steam on the mirror surface.

SUMMARY OF THE INVENTION

As noted above, there are a number of disadvantages associated with the currently available mirror assemblies for use in the field of personal care. For example, in some currently available systems, information (typically provided in the form of visual elements) cannot be displayed at an area overlapping or adjacent to the reflective image of the user. As another example, some currently available systems are configured such that the reflective image of the user is to be completely ignored and therefore the essence of a smart "mirror" is negated. It would therefore be advantageous to provide an improved mirror assembly that addresses these disadvantages directly by displaying visual element(s) and/or blurred effect element(s) in such a way that does not trigger a user to refocus his/her gaze, and a method for displaying at least one of a visual element and a blurred effect element at a display unit of a mirror assembly which achieve the same effect.

To better address one or more of the concerns mentioned earlier, in a first aspect, there is provided a mirror assembly. The mirror assembly comprises a reflective portion configured to reflect incident light; a display unit arranged to overlap the reflective portion, wherein the display unit is configured to display at least one of a visual element and a blurred effect element; and a control unit is configured to: receive instruction to display a visual element or instruction to display a blurred effect element; determine, based on the received instruction, a blur region for the visual element or a motion trajectory of the blurred effect element, wherein the blur region or the blurred effect element is larger than a display resolution of the display unit; and control the display unit to display the visual element with the determined blur region or to display the blurred effect element in the determined motion trajectory in a field of view of a user.

In some embodiments, the control unit may be further configured to receive a pupil diameter of the user. In these embodiments, determining the blur region for the visual element may be based on the received pupil diameter of the user.

In some embodiments, the control unit may be further configured to receive a distance between the user and the mirror assembly. In these embodiments, determining the blur region for the visual element may be based on the received distance between the user and the mirror assembly. Moreover, in these embodiments, determining the blur region for the visual element may comprise: determining a focal distance between the user and the reflective image of the user at the reflective portion based on the received distance between the user and the mirror assembly; and determining the blur region for the visual element based on:

the focal distance between the user and the reflective image of the user and the received distance between the user and the mirror assembly.

In some embodiments, the mirror assembly may further comprise a distance sensor unit configured to detect the distance between the user and the mirror assembly.

In some embodiments, the control unit may be further configured to receive information indicating a part of the reflective image of the user to be highlighted, and to determine the motion trajectory of the blurred effect element based on the received information indicating the part of the reflective image of the user to be highlighted.

In some embodiments, the control unit may be further configured to determine the blur region for the visual element based on an ambient lighting condition.

In some embodiments, the control unit may be further configured to: determine whether the visual element is to be displayed at an area at the display unit corresponding to a reflective image of the face of the user at the reflective portion; and control the display unit to display the visual element with the blur region only if it is determined that the visual element is to be displayed at the area corresponding to the reflective image of the face of the user.

In some embodiments, the mirror assembly may further comprise a location sensor unit configured to determine a location of the user relative to the mirror assembly. In these embodiments, the control unit may be further configured to determine the area at the display unit corresponding to the reflective image of the face of the user based on the determined location of the user relative to the mirror assembly.

In some embodiments, the mirror assembly may further comprise an orientation sensor unit configured to detect an orientation of the head of the user. In these embodiments, the control unit may be further configured to determine the area at the display unit corresponding to the reflective image of the face of the user based on the orientation of the head of the user.

In a second aspect, there is provided a method for displaying at least one of a visual element and a blurred effect element at a display unit of a mirror assembly. The method comprises: receiving instruction to display a visual element or instruction to display a blurred effect element; determining, based on the received instruction, a blur region for the visual element or a motion trajectory of the blurred effect element, wherein the blur region or the blurred effect element is larger than a display resolution of the display unit; and controlling the display unit to display the visual element with the determined blur region or to display the blurred effect element in the determined motion trajectory in the field of view of a user.

In some embodiments, the method may further comprise receiving a pupil diameter of the user. In these embodiments, determining the blur region for the visual element may comprise determining the blur region based on the received pupil diameter of the user.

In some embodiments, the method may further comprise receiving a distance between the user and the mirror assembly. In these embodiments, determining the blur region for the visual element may comprise determining the blur region based on the received distance between the user and the mirror assembly.

In some embodiments, the method may further comprise receiving information indicating a part of the reflective image of the user to be highlighted. In these embodiments, determining the motion trajectory of the blurred effect element may comprise determining the motion trajectory based on the received information indicating the part of the reflective image of the user to be highlighted.

In a third aspect, there is provided a computer program product comprising a computer readable medium, the computer readable medium having computer readable code embodied therein, the computer readable code being configured such that, on execution by a suitable computer or processor, the computer or processor is caused to perform the method as described herein.

According to the aspects and embodiments described above, the limitations of existing techniques are addressed. In particular, the above-described aspects and embodiments provide a mirror assembly capable of displaying information seamlessly without any sharp delineation such that unwanted shifts in focus of the user between the displayed information and the reflective image are avoided. In this way, the above-described aspects and embodiments enable a more immersive and convenient user experience by reducing eye fatigue of the user and preventing the user from being distracted. There is thus provided an improved mirror assembly and a method for displaying at least one of a visual element and a blurred effect element at a display unit of a mirror assembly. These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which:

FIGS. 4A to 4D are top-view schematic diagrams illustrating the mirror assembly of FIG. 3 during use;

DETAILED DESCRIPTION OF THE EMBODIMENTS

As noted above, there is provided an improved mirror assembly and a method for displaying at least one of a visual element and a blurred effect element at a display unit of a mirror assembly which addresses the existing problems.

Figure 1A:
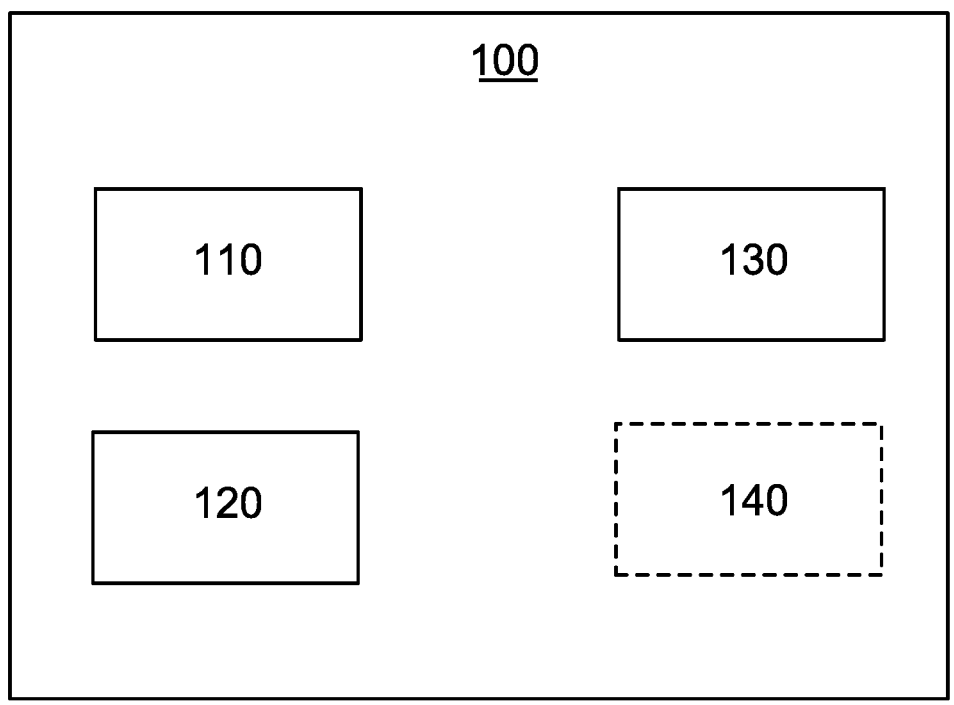
FIG. 1A is a block diagram of a mirror assembly according to an embodiment.
Figure 1B:
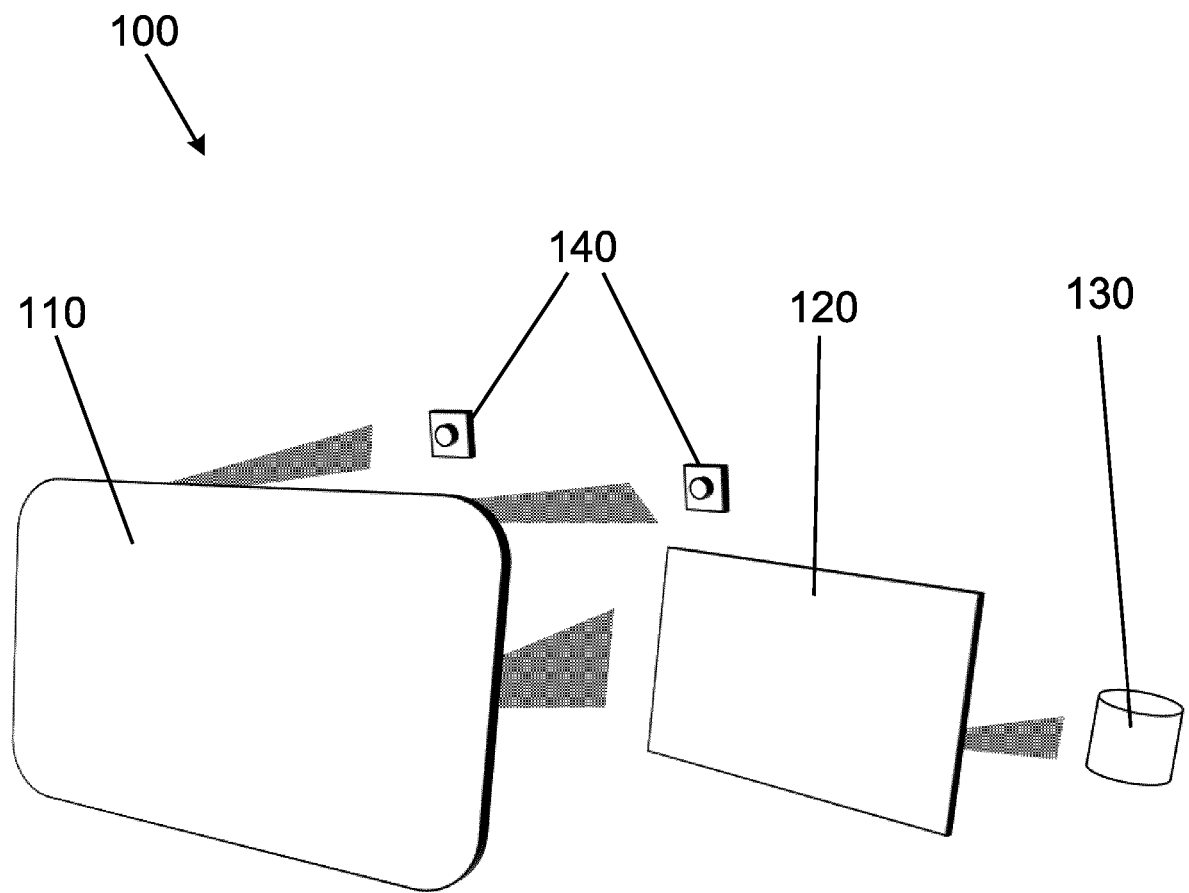
FIG. 1B is an exploded-view diagram of the mirror assembly of FIG. 1A.

FIG. 1A is a block diagram of a mirror assembly 100 according to an embodiment, and FIG. 1B is an exploded-view diagram of the mirror assembly 100. The mirror assembly 100 comprises a reflective portion 110, a display unit 120, and a control unit 130, and a sensor unit 140. The reflective portion 110 is configured to reflect incident light, and can be a two-way mirror in some embodiments. The display unit 120 is arranged to overlap the reflective portion 110, and is configured to display at least one of a visual element and a blurred effect element.

In some embodiments, the display unit 120 may be arranged to only partially overlap the reflective portion. In some cases, the visual element and/or the blurred effect element may be displayed at the overlap area of the reflective portion 110 and the display unit 120. The visual element may be, for example, one of a variety of components such as windows or icons. In some embodiments, the visual element may be an overlay face outline which is configured to correspond to a reflective image of the face of a user when viewed from the perspective of the user. In some embodiments, the blurred effect element may be a blurred dot, for example.

The control unit 130 is configured to receive instruction to display a visual element or instruction to display a blurred effect element, and to determine, based on the received instruction, a blur region for the visual element or a motion trajectory of the blurred effect element, wherein the blur region or the blurred effect element is larger than a display resolution of the display unit 120 by design. As the blur region or the blurred effect element is intentionally larger than the display resolution of the display unit 120, the blur effect caused by the blur region or the blurred effect element (i.e. as perceived by a user) is similar to that of a de-focus blur. Specifically, the blur effect is a smooth blur without any display pixelization effects or artefacts. The control unit 130 is further configured to control the display unit 120 to display the visual element with the determined blur region or to display the blurred effect element in the determined motion trajectory in a field of view of a user.

As will be explained in more detail below with reference to FIG. 5A and FIG. 5B, the focal distance between the user and information displayed at the display unit 120 (including visual element(s) and/or blurred effect element(s)) is considerably shorter than the focal distance between the user and their own reflective image, with the former distance being approximately half of the latter distance in most typical cases. With these different relative focal distances which are also relatively short (typically less than 2 m), there is a discernable shift in focus of the eye to observe both the displayed information and the reflective image.

In more detail, for the human visual system, objects at a distance of at least 2 m or more can generally be perceived as all in-focus. At distances shorter than that, the human visual system has a limited focal depth and therefore objects out of the focal depth range are perceived as indistinct. As the human vision system tends to seek a sharp image, it derives its depth-cue for focusing at relatively short distances also from parallax (i.e. horizontal disparity of left and right eye images).

The parallax cue is the most dominant immediately around the current focal depth. To explain in further detail, the cue for adapting focus is taken from the parallax to focus or adapt mainly around the current focal depth, e.g. to adapt from 1.1 m to 1.2 m focal distance, and the cue to adapt focus in other focal depth ranges, e.g. to adapt from 1.1 m to 0.5 m, is taken mostly from the defocus blur and the effect of the change in focus of the eye, rather than from the parallax. In this case, the visual element(s) displayed at the display unit 120 are so far out of the focal plane of the reflective image that the blur region becomes the dominant cue. In addition, the perceived blur associated with information that is displayed out of the user's focal plane is caused by both the actual focal point of the human eye and by the misalignment of the left and right eye image. With respect to the configuration of the mirror assembly as described herein, the defocus blur is regarded to be the dominant cue.

Therefore, in some embodiments, the control unit 130 may be configured to determine the blur region or the blurred effect element such that the size of the blur region or the blurred effect element is larger than the amount of out-of-focus blur incurred from the difference in focal distances, i.e. the difference between the distance between the user and the mirror assembly and the distance between the user and the reflective image of the user. In these embodiments, the size of the blur region or the blurred element may be an order of magnitude larger than the amount of out-of-focus blur so as to reduce or suppress the human vision's propensity to seek focus. When the size of the blur region or the blurred element is in an order of magnitude larger than the amount of out-of-focus blur, there is relatively less urge for the human vision system to shift focus due to detection of sharpness improvement.

Furthermore, from the perspective of the user, the blur region for the visual element, when displayed along with the visual element at an area that at least partially overlaps the reflective image of the user, would cause a "merging" effect between the displayed visual element and the reflective image of the user. Thus, by determining the blur region and displaying the visual element with the blur region, the mirror assembly 100 as described above eliminates unwanted visual cues that cause the user to refocus between the displayed visual element and the reflective image during use of the mirror assembly 100.

In some embodiments, the control unit 130 may be further configured to receive a pupil diameter of the user. For example, the pupil diameter of the user may be received as a user input at a user interface or detected via a sensor unit. As another example, the control unit 130 may retrieve a default value for the pupil diameter (e.g. 4 mm) of the user from a memory. In these embodiments, the control unit 130 may be configured to determine the blur region for the visual element based on the received pupil diameter of the user.

Alternatively or in addition, in some embodiments, the control unit 130 may be further configured to receive a distance between the user and the mirror assembly 100. For example, the distance between the user and the mirror assembly 100 may be received as a user input at a user interface or detected via a sensor unit (e.g. a distance sensor unit). In these embodiments, the control unit 130 may be configured to determine the blur region for the visual element based on the received distance between the user and the mirror assembly 100. Moreover, in these embodiments, the control unit 130 may be configured to determine a focal distance between the user and the reflective image of the user at the reflective portion 110 based on the received distance between the user and the mirror assembly 100. The control unit 130 may then be configured to determine the blur region for the visual element based on the focal distance between the user and the reflective image of the user and the received distance between the user and the mirror assembly 100.

In some embodiments, the control unit 130 may be further configured to receive information indicating a part of the reflective image of the user to be highlighted, and to determine the motion trajectory of the blurred effect element based on the received information indicating the part of the reflective image of the user to be highlighted. An example of this is provided at FIG. 8A to FIG. 8E and will be explained below with reference to these drawings.

In some embodiments, the control unit 130 may be further configured to determine the blur region for the element based on an ambient lighting condition. The ambient lighting condition may be received as a user input via a user interface, or detected via a sensor unit (e.g. a light sensor unit). In some embodiments, the ambient lighting condition may be represented by an ambient lighting value. Moreover, in some embodiments, the ambient lighting value may be used as a proxy value of the pupil diameter of the user. For example, reference values and/or typical values for low light (e.g. 5 mm) and bright light (e.g. 2 mm) can be used.

In some embodiments, the control unit 130 may be further configured to determine whether the visual element is to be displayed at an area at the display unit 120 corresponding to a reflective image of the face of the user at the reflective portion, and to control the display unit 120 to display the visual element with the blur region only if it is determined that the visual element is to be displayed at the area corresponding to the reflective image of the face of the user.

In these embodiments, the control unit 130 may be further configured to determine the area at the display unit 120 corresponding to the reflective image of the face of the user based on a location of the user relative to the mirror assembly 100. As will be explained with respect to the sensor unit 140 below, the location of the user relative to the mirror assembly 100 may be detected by a location sensor unit provided at the mirror assembly 100. Furthermore, in some of these embodiments, the control unit 130 may be configured to determine the area at the display unit 120 corresponding to the reflective image of the face of the user based on an orientation of the head of the user. In these embodiments, the orientation of the head of the user may be determined by an orientation sensor unit (which may be provided as a sub-unit of the sensor unit 140 in the present embodiment).

In some embodiments, the control unit 130 may be further configured to, subsequent to determining the area at the display unit 120 corresponding to the reflective image of the face of the user, display the visual element or the blurred effect element at the determined area.

The control unit 130 can comprise one or more processors, processing units, multi-core processor or modules that are configured or programmed to control the apparatus 10 in the manner described herein. In particular implementations, the control unit 130 can comprise a plurality of software and/or hardware modules (e.g. image analysis software) that are each configured to perform, or are for performing, individual or multiple steps of the method described herein.

The control unit 130 can be implemented in numerous ways, with software and/or hardware, to perform the various functions described below. The control unit 130 may comprise one or more microprocessors or digital signal processor (DSPs) that may be programmed using software or computer program code to perform the required functions and/or to control components of the control unit 130 to effect the required functions. The control unit 130 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The sensor unit 140 in the present embodiment comprises a plurality of sub-units (not shown in the drawing). These sub-units may include at least one of: a distance sensor unit configured to detect the distance between the user and the mirror assembly 100, a light sensor unit configured to detect an ambient lighting condition, a location sensor unit configured to determine a location of the user relative to the mirror assembly 100, and an orientation sensor unit configured to detect an orientation of the head of a user. In some embodiments, the sensor unit 140 may be implemented as a camera capable to be operated with Facial Landmark Detection (FLD) algorithms.

In some embodiments where the sensor unit 140 comprises a location sensor unit, the control unit 130 may be further configured to determine an area at the display unit 120 which corresponds to the field of view of the user based of the location of the user relative to the mirror assembly 100, and to control the display unit 120 to display the visual element or the blurred effect element in the area which corresponds to the field of view of the user.

In some embodiments, the mirror assembly 100 may further comprise at least one user interface. Alternative or in addition, at least one user interface may be external to (i.e. separate to or remote from) the mirror assembly 100. A user interface may be configured to receive a user input. For example, a user interface may allow a user of the mirror assembly 100 to manually enter instructions, data, or information. In these embodiments, the control unit 130 may be configured to acquire the user input from one or more user interfaces.

A user interface may be any user interface that enables the rendering (or output or display) of information to a user of the mirror assembly 100. Alternatively or in addition, a user interface may be any user interface that enables a user of the mirror assembly 100 to provide a user input, interact with and/or control the mirror assembly 100. For example, the user interface may comprise one or more switches, one or more buttons, a keypad, a keyboard, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces. In some embodiments, the display unit 120 of the mirror assembly 100 may be implemented as part of the user interface.

It will be appreciated that FIG. 1A and FIG. 1B only show the components required to illustrate an aspect of the mirror assembly 100, and in a practical implementation, the mirror assembly 100 may comprise alternative or additional components to those shown. For example, the mirror assembly may comprise means for connecting to a power supply or a battery for powering the mirror assembly 100.

Figure 2:
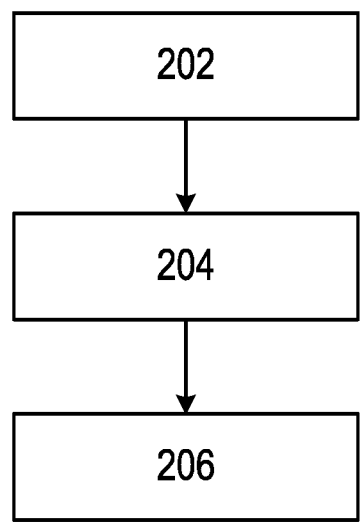
FIG. 2 illustrates a method for displaying at least one of a visual element and a blurred effect element at the display unit of FIG. 1A and FIG. 1B.

FIG. 2 illustrates a method for displaying at least one of a visual element and a blurred effect element at the display unit of FIG. 1A and FIG. 1B. The method can be generally performed or under the control of the control unit 130 of the mirror assembly 100.

With reference to FIG. 2, at block 202, instruction to display a visual element or instruction to display a blurred effect element is received. Specifically, the instruction is received at the control unit 130. In some embodiments, the instruction may be received via a user interface at the mirror assembly 100. For example, instructions may be generated at the control unit 130 based on an operation mode selected by the user via the user interface. In more detail, in some embodiments the user may select a "guidance mode" in which a visual guidance overlay is to be displayed at the display unit 120 to highlight a part of the reflective image of the user (e.g. a specific part of the user's face) so as to provide guidance with regard to a personal care activity to be performed by the user. In this case, instruction to display blurred effect element is generated and subsequently received by the control unit 130 of the mirror assembly 100.

Returning to FIG. 2, at block 204, a blur region for the visual element or a motion trajectory of the blurred effect element is determined at the control unit 130. This determination is based on whether the instruction received at block 202 relates to the display of a visual element or the display of a blurred effect element. In some embodiments, the method may further comprise determining a size of the blur region or the blurred effect element based on the instruction received at block 202. The determination of the size of the blur region or the blurred effect element may also be based on a distance between the user and the mirror assembly 100, in some embodiments. Moreover, in some embodiments, the method may further comprise adjusting the size of the visual element based on the instruction received at block 202.

Returning to FIG. 2, at block 206, the display unit 120 of the mirror assembly 100 is controlled to display the visual element with the blur region determined at block 204 or to display the blurred effect element in the motion trajectory determined at block 204. The visual element or the blurred effect element is displayed in the field of view of a user. As mentioned above with reference to FIG. 1, in some embodiments the display unit 120 may be controlled by the control unit 130 to display the visual element or the blurred effect element at an area corresponding to the reflective image of the face of the user. This area may be determined by the control unit 130, for example based on an orientation of the head of the user.

In some embodiments, the method may further comprise receiving a pupil diameter of the user. In these embodiments, determining the blur region for the visual element at block 204 may comprise determining, by the control unit 130, the blur region based on the received pupil diameter of the user. Also, in these embodiments, the method may further comprise detecting the pupil diameter of the user by the sensor unit 140 prior to receiving the pupil diameter of the user by the control unit 130.

In some embodiments, the method may further comprise receiving a distance between the user and the mirror assembly 100. In these embodiments, determining the blur region for the visual element at block 204 may comprise determining, by the control unit 130, the blur region based on the received distance between the user and the mirror assembly 100. Also, in these embodiments, the method may further comprise detecting or determining the distance between the user and the mirror assembly 100 by the sensor unit 140 prior to receiving the distance between the user and the mirror assembly 100 by the control unit 130.

In some embodiments, the method may further comprise receiving information indicating a part of the reflective image of the user to be highlighted. This information may be received via a user input. In these embodiments, determining the motion trajectory of the blurred effect element at block 204 may comprise determining the motion trajectory based on the received information indicating a part of the reflective image of the user to be highlighted.

Figure 3:
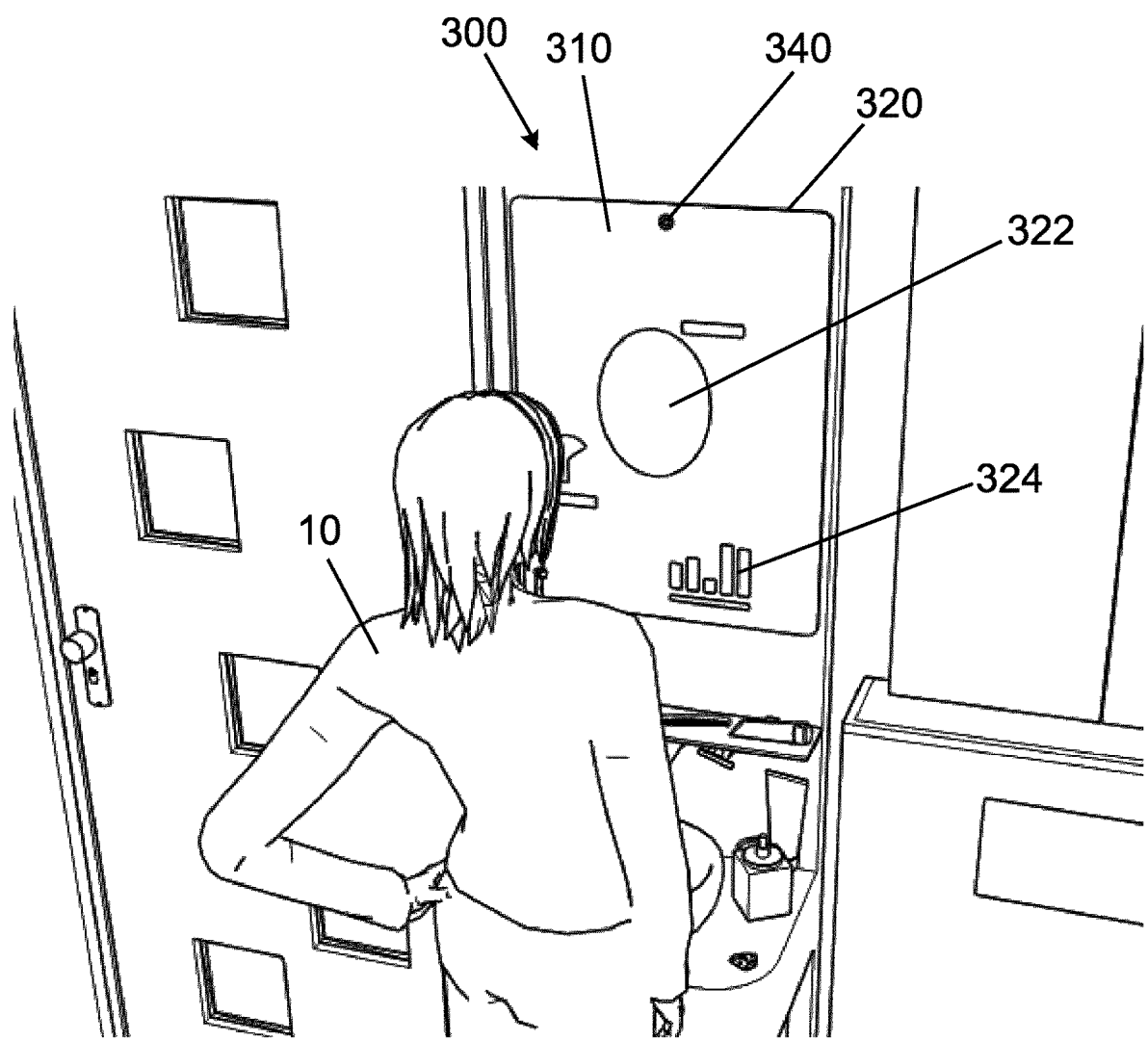
FIG. 3 is a perspective diagram illustrating a mirror assembly during use by a user, according to an embodiment.

FIG. 3 is a perspective diagram illustrating a mirror assembly 300 during use by a user 10, according to an embodiment, and FIGS. 4A to 4D are top-view schematic diagrams illustrating the mirror assembly 300 of FIG. 3 during use. The mirror assembly 300 of FIG. 3 is similar to that shown in FIG. 1A and FIG. 1B in that it also comprises a reflective portion 310, a display unit 320, and a control unit (not shown in the drawing). Moreover, the sensor unit 340 is implemented as a camera with its lens being arranged at a top part of the mirror assembly 300.

As shown in FIG. 3, during use of the mirror assembly 300, a user 10 can position himself/herself in front of the reflective portion 310 of the mirror assembly 300, which is typically mounted over a vanity or a sink in a bathroom. In the present embodiment, the display unit 320 completely overlaps the reflective portion 310 (which is more explicitly demonstrated in FIG. 4A, for example), and the display unit 320 is configured to display components including visual element(s) and/or blurred effect element(s) directly behind the reflective portion 310. Examples of the visual elements are shown in FIG. 3, in which a visual overlay face outline 322 corresponding a position of the reflective image of the face of the user is displayed. In other words, from the point of view of the user 10, the visual overlay face outline 322 would overlap the reflective image of his/her face. Also, additional information such as a graph 324 relating to usage information may be displayed at the display unit 320 as another visual element.

As shown in FIG. 4A, the reflective portion 310, the display unit 320, and the sensor unit 340 of the mirror assembly 300 in a top-view are illustrated. As mentioned above, the sensor unit 340 is implemented as a camera, the camera being arranged directly behind the reflective portion 310 and the display unit 320 from a perspective of the user 10. The horizontal field of view 12 of the sensor unit 340 is also represented in the FIG. 4A.

The corresponding positions of a reflective image 14 of the user 10 are shown in FIGS. 4B to 4D, in which the user 10 is seen to be positioned at different locations with respect to the mirror assembly 300 and therefore the reflective images 14 of the user are also positioned accordingly in each case. To clearly show these corresponding positions, the sensor unit 340 is omitted from FIGS. 4B to 4D and the mirror assembly 300 is labelled in these drawings as a whole.

It can be seen from FIG. 4C that in some cases the user 10 can position himself/herself in front of the mirror assembly such that the projected scope area of the user 16 substantially corresponds to the surface area of the mirror assembly 300. On the other hand, as demonstrated in FIG. 4B and FIG. 4D, the user 10 can also position himself/herself such that only a part of the projected scope area 16 along the plane of the mirror assembly 300 corresponds to the surface area of the mirror assembly 300. This projected scope area 16 can be regarded as the area at the display unit 320 which corresponds to the field of view of the user. Therefore, the control unit of the mirror assembly 300 in the present embodiment may be configured to control the display unit 320 to display the visual element or the blurred effect element in the area which corresponds to the field of view of the user. This control may be performed in a dynamic manner such that position at which the visual element or the blurred effect element is displayed at the display unit 320 can be adjusted in real time as the user 10 moves with respect to the mirror assembly 300.

Figure 6B:
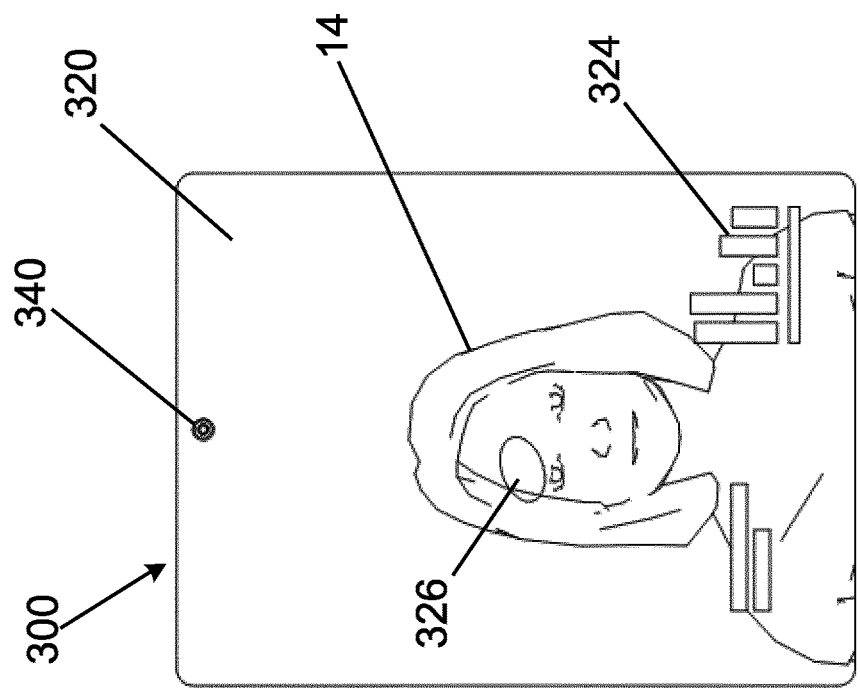
FIG. 6A and FIG. 6B illustrate a visual element being displayed at the display unit of the mirror assembly of FIG. 3 in a perspective view and a front facing view respectively.
Figure 6A:
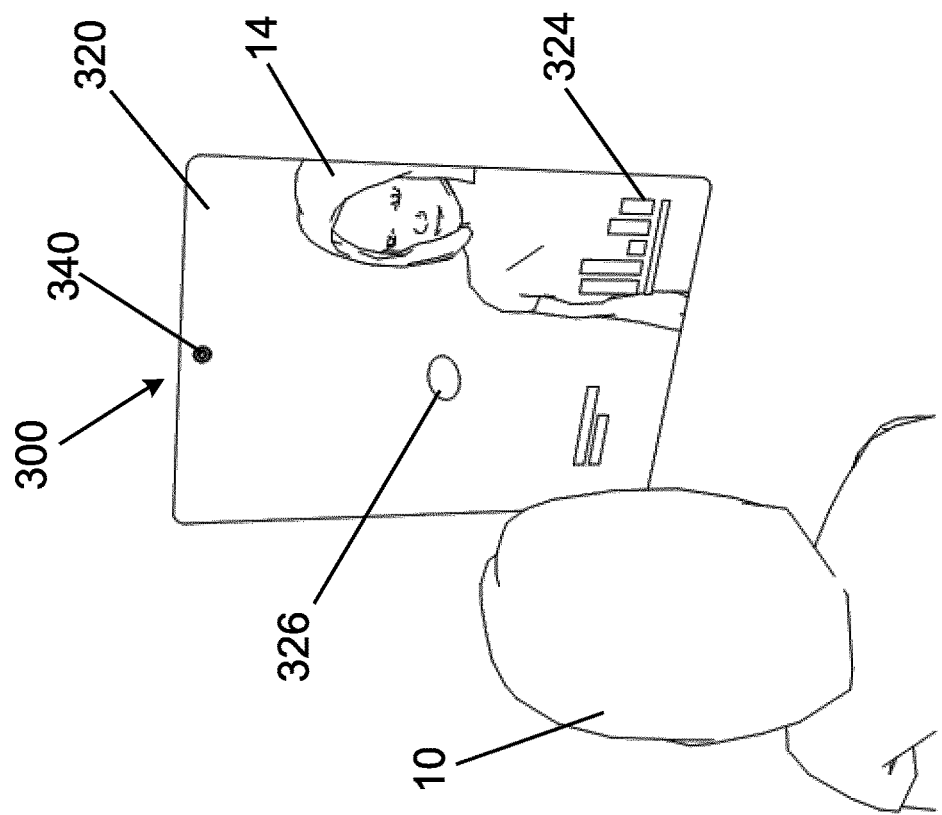
Figure 7B:
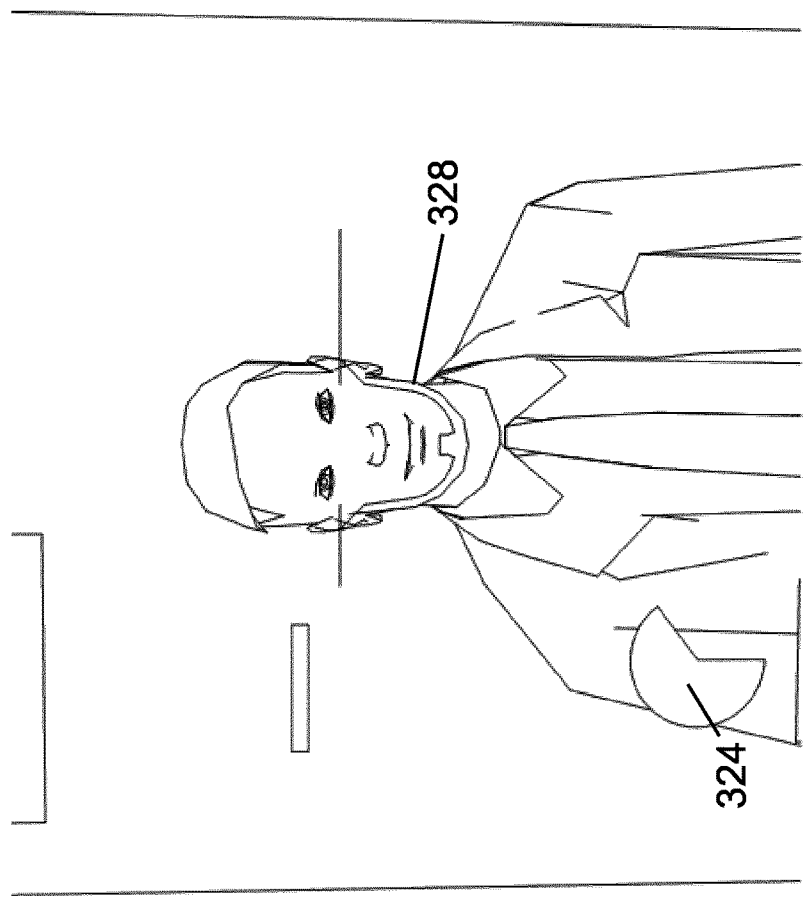
FIG. 7A and FIG. 7B illustrate a blurred effect element being displayed at the display unit of the mirror assembly of FIG. 3 in a perspective view and a front facing view respectively.
Figure 7A:
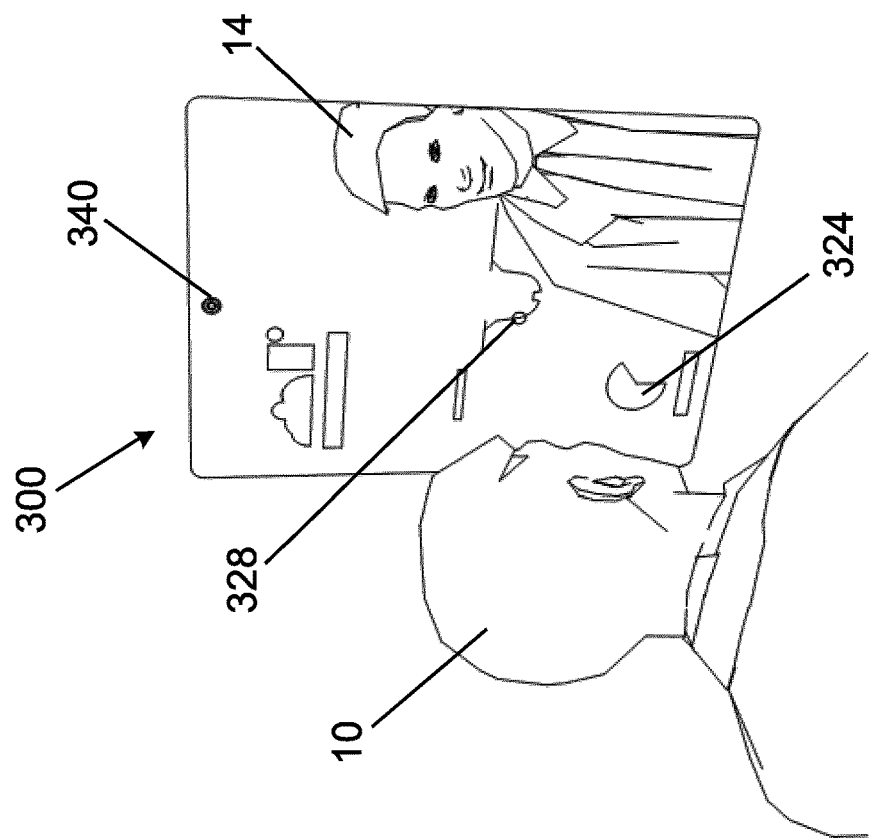

An example of a visual element 326 being displayed with a blur region at the display unit 320 of the mirror assembly 300 is provided in FIG. 6A and FIG. 6B. Also, an example of a blurred effect element being displayed in a motion trajectory to form a guidance overlay 328 to highlight a part of the face of the user is provided in FIG. 7A and FIG. 7B. In each of these examples, the visual element or guidance overlay 328 is displayed alongside additional information such as a graph 324 relating to usage information at the display unit 320.

Figure 5A:
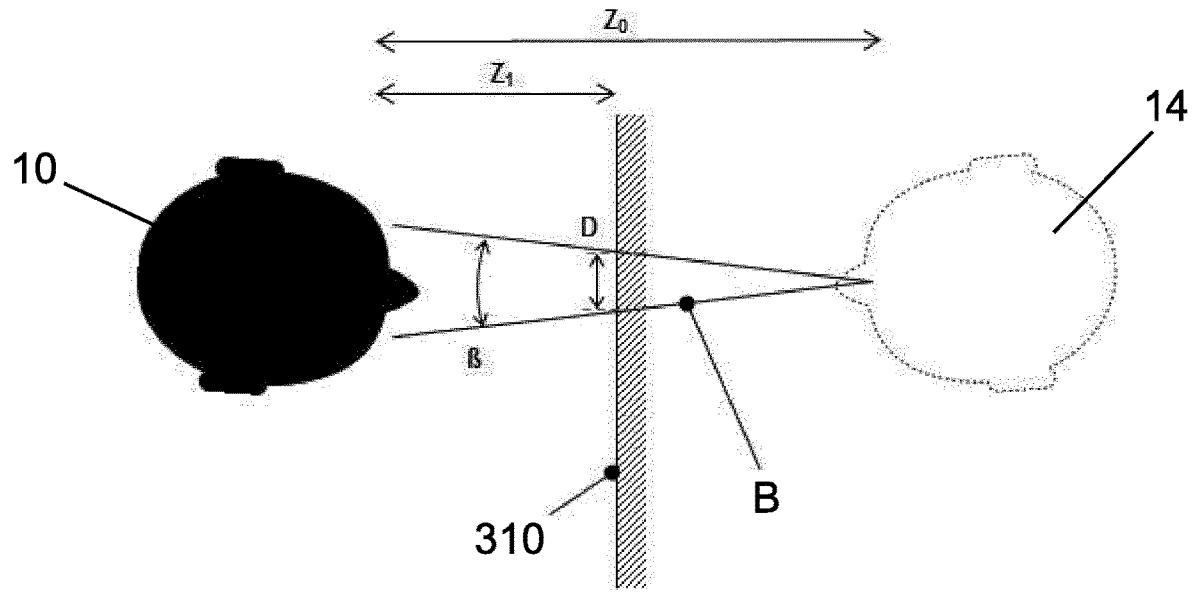
FIG. 5A and FIG. 5B illustrate a relationship between a distance between the user and the mirror assembly of FIG. 3 and a focal distance between the user and the reflective image of the user.
Figure 5B:
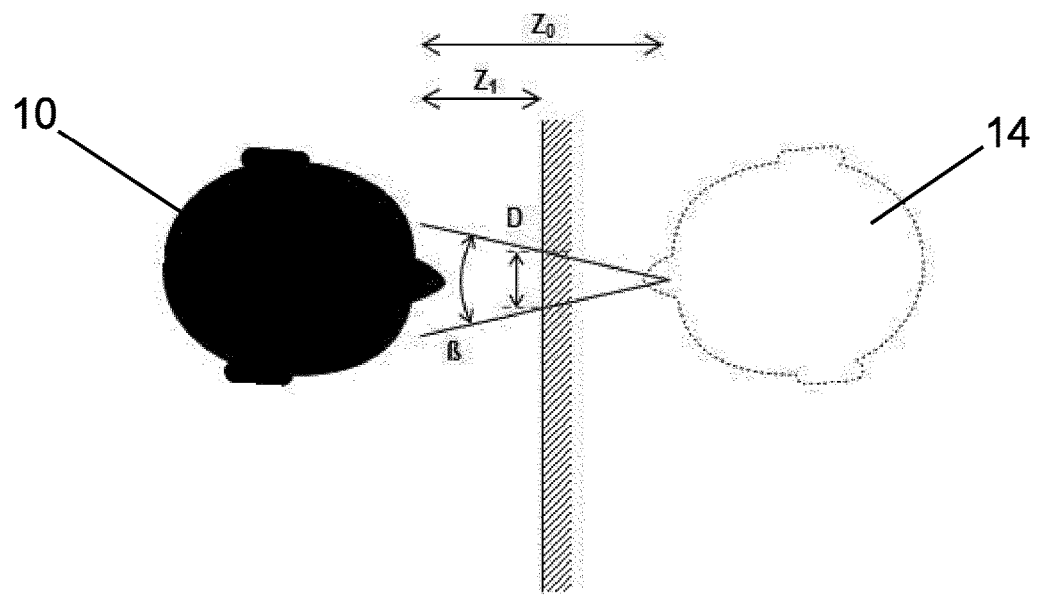
Figure 5C:
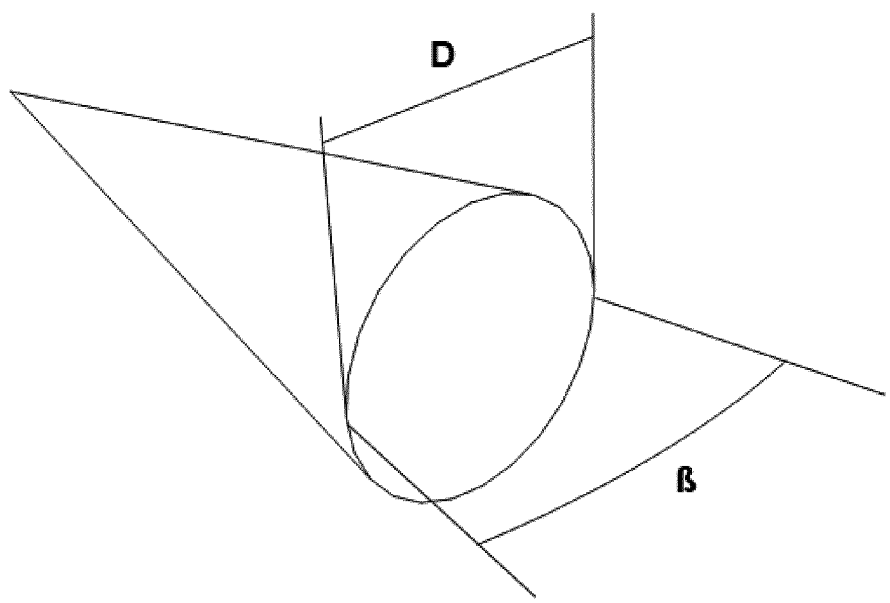
FIG. 5C is a diagram of a three-dimensional cone representing a relationship between the size of a blur-circle and a distance from the focal point.

FIG. 5A and FIG. 5B illustrate a relationship between a distance between the user and the mirror assembly 300 of FIG. 3 and a focal distance between the user and the reflective image of the user, and FIG. 5C is a diagram of a three-dimensional cone representing a relationship between the size of a blur-circle and a distance from the focal point.

As shown in FIG. 5A and FIG. 5B, the distance between the user 10 and the reflective portion 310 is labelled as $Z_1$ while the distance between the user 10 and the reflective image 14 of the user (and thus the focal distance of the user looking at the reflective image) is labelled as $Z_0$.

In the present embodiment, the distance between the user 10 and the reflective portion 310 is the same as the distance between the user 10 and the mirror assembly. Therefore, in this case, the relationship between $Z_1$ and $Z_0$ can be represented by the equation $Z_0=2Z_1$. This is because the focal distance between the user 10 and the reflective image 14 is the sum of the distance between the user 10 and the mirror assembly and the distance between the reflective portion 310 and the reflective image 14, and also because the distance between the reflective portion 310 and the reflective image 14 is the same as the distance between the user 10 and the mirror assembly. Accordingly, in the present embodiment, the control unit of the mirror assembly can determine the focal distance between the user 10 and the reflective image 14 of the user based on the distance between the user 10 and the mirror assembly 300 based on the equation $Z_0=2Z_1$. The distance between the user 10 and the mirror assembly 300 can be detected or determined by the sensor unit 340 or received via a user input at a user interface.

As an example, a typical distance between the user 10 and the mirror assembly 300 is in the order of around 50 cm for general usage. In this particular example, the focal distance between the user 10 and the information (e.g. a visual element) displayed at the display unit 320 is around 50 cm while the focal distance between the user 10 and the reflective image 14 is around 100 cm.

Since the information displayed at the display unit 320 in this embodiment would be displayed at approximately half the focal distance of that of the user's reflective image 14, when the user's focus is on their reflective image 14 the displayed information would appear smaller and when the user's focus is on the displayed information it will appear larger. Therefore, in some embodiments, the size of the blur region, the visual element, and/or the blurred effect element is determined in a way that takes into size perception by the user when the user's focus is on their reflective image 14.

As shown in FIG. 5A, FIG. 5B, and FIG. 5C, in order to display a visual element with a blur region which overlaps the reflective image of the face of the user in this case, the blur region D' should correspond to the blur-circle diameter D as follows from the defocus angle of blur β at the plane of the reflective portion 310. FIG. 5C further illustrates the angle of blur β of the user in a diagram in which the relationship between the angle of blur β and the blur-circle or 'circle of confusion' region diameter D is demonstrated. Also, the cone shape shown in the diagram demonstrates how the size of the blur-circle increases as the distance from the focal point increases.

The magnitude of a perceived optical blur (defocus blur) of an object at a shorter focal distance compared to a current focal distance of the user can be approximated as a factor of the pupil diameter. Specifically, the magnitude of the perceived optical blur can be approximated using equation (1) below, in which β represents the angle of blur, A represents the pupil diameter of the user, $Z_1$ represents the distance between the user 10 and the mirror assembly, and $Z_0$ represents the focal distance between the user 10 and the reflective image 14:

$$\beta \approx A \left| \frac{1}{Z_0} - \frac{1}{Z_1} \right| \qquad (1)$$

Moreover, under the assumption that the distance between the user 10 and the mirror assembly is the same as the distance between the distance between the reflective portion 310 and the reflective image 14, the relationship between the blur region diameter D, the angle of blur β, and the distance between the user 10 and the mirror assembly $Z_1$ can be represented using equation (2) provided below:

$$D = \beta \cdot Z_1 \qquad (2)$$

Table 1 below includes some typical distances for general use of a mirror assembly and their associated angle of blur β and blur region diameters D. In this case, the distance between the user 10 and the mirror assembly $Z_1$ and the angle of blur β compensate each other such that the blur region diameter D stays constant.

TABLE 1

Relationships between $Z_1$, $Z_0$, A, β, and D according to equations (1) and (2).

| $Z_1$ (m) | $Z_0$ (m) | A (m) | β (radians) | D (m) |
|---|---|---|---|---|
| 0.5 | 1.0 | 0.004 | 0.004 | 0.002 |
| 0.4 | 0.8 | 0.004 | 0.005 | 0.002 |
| 0.3 | 0.6 | 0.004 | 0.007 | 0.002 |
| 0.2 | 0.4 | 0.004 | 0.010 | 0.002 |
| 0.1 | 0.2 | 0.004 | 0.020 | 0.002 |

For an exemplary scenario in which $Z_0$ has a value of 1 m and $Z_1$ has a value of 0.5 m, and using a typical pupil diameter of 4 mm (under artificial lighting, e.g. in a bathroom), the angular field of view β would be 0.004 radians and the diameter D of the blur region would be 0.002 m. In some embodiments, the blur region D' for the visual element may be determined as a factor of D rather than D itself, e.g. 0.004 or 0.008 m instead of 0.002 m. The factor by which D is multiplied to obtain the blur region D' may be based on the distance between the user and the mirror assembly, for example. In some embodiments, this factor may be determined based on the type of information that is conveyed by the relevant visual element, since a desired extent of blurriness may be higher for conveying certain types of information than other types of information (e.g. indicating a spot of apply face cream vs a sideburn trimming guide).

As the blur region has a diameter corresponding to an order of magnitude of the defocus blur in this case, there is no sharp trigger to the human visual system for causing a shift in focus. Thus, the user is able to perceive the displayed visual element with the blur region together with the reflective image as a single merged image. Moreover, the size of the blur region may be further dynamically adjusted based on the distance between the user and the mirror assembly and using the equation(s) provided above, for example when the user moves closer or further away from the mirror assembly.

Although it is described above that in the present embodiment the distance between the user 10 and the reflective portion 310 is the same as the distance between the user 10 and the mirror assembly 300, it will be appreciated that in alternative embodiments the reflective portion may not be positioned at the mirror assembly such that the distances are equivalent. In these embodiments, the distance between the user and the displayed information and the focal distance between the user and the reflective image may be determined (by the control unit) separately, based on the physical arrangement of the reflective portion and the display unit at the mirror assembly as well as the location of the user with respect to the mirror assembly. For example, if the display unit is placed further back from the reflective portion 310 inside the mirror assembly 300, this will place the displayed visual element(s) and/or blurred effect element(s) at a distance that is larger than $Z_1$ (and smaller than $Z_0$).

Figure 8C:
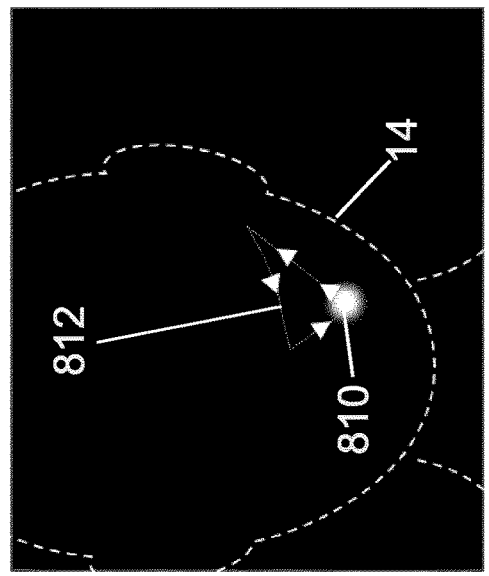
FIG. 8A to FIG. 8C illustrate a motion trajectory of a blurred effect element overlapping a reflective image of the user at the display unit of the mirror assembly according to an embodiment.
Figure 8B:
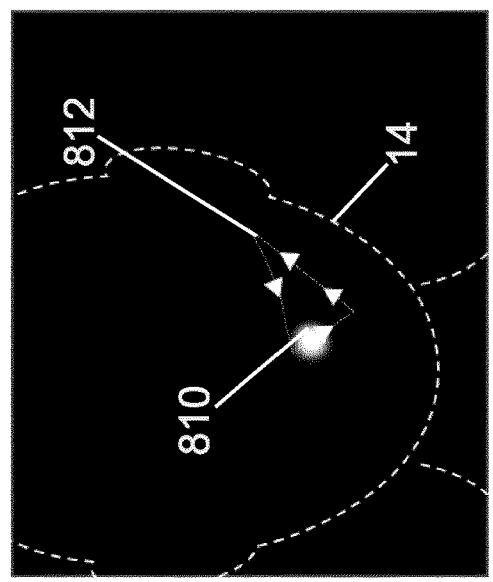
Figure 8A:
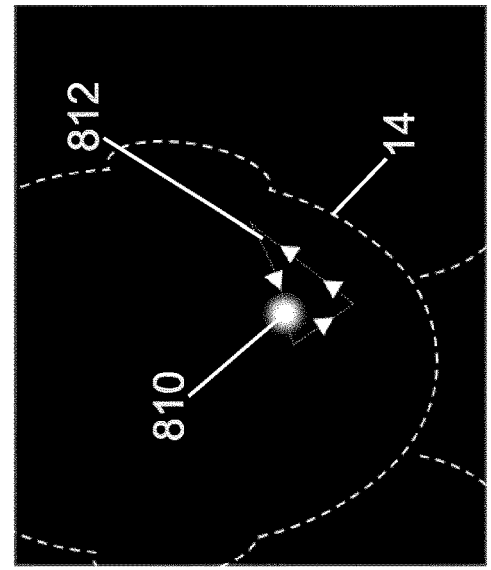
Figure 8E:
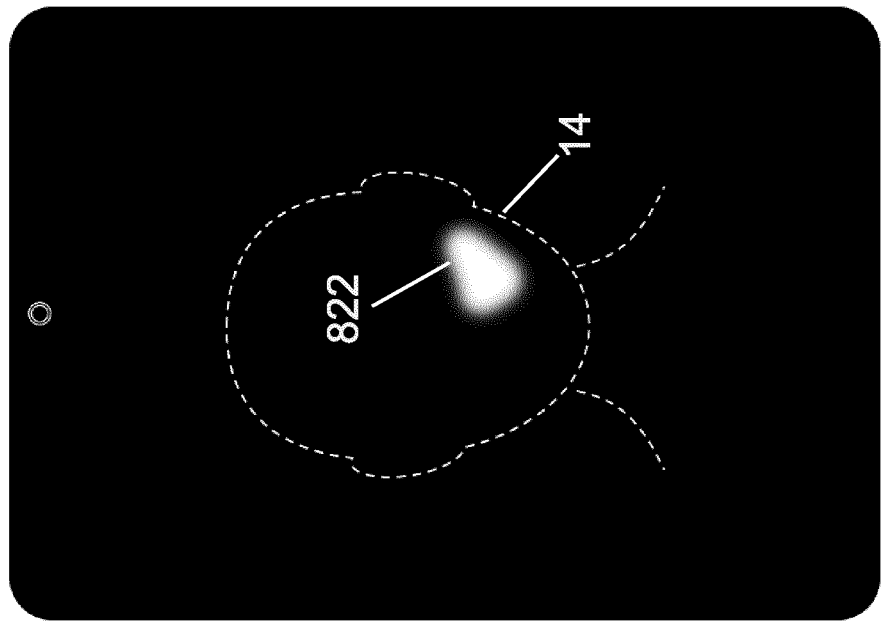
FIG. 8E illustrates a non-moving display overlay having a blur region.

FIG. 8A to FIG. 8C illustrate a motion trajectory 812 of a blurred effect element 810 overlapping a reflective image of the user at the display unit of a mirror assembly according to an embodiment. As illustrated in FIG. 8A to FIG. 8C, the motion trajectory 812 determined by the control unit in this case follows the shape of a triangle to partially overlay the reflective image 14 of the user's face so as to highlight a specific part of the face of a user. Specifically, in the present embodiment, the motion trajectory 812 is determined based on information indicating that the right cheek of the user is to be highlighted.

Figure 8D:
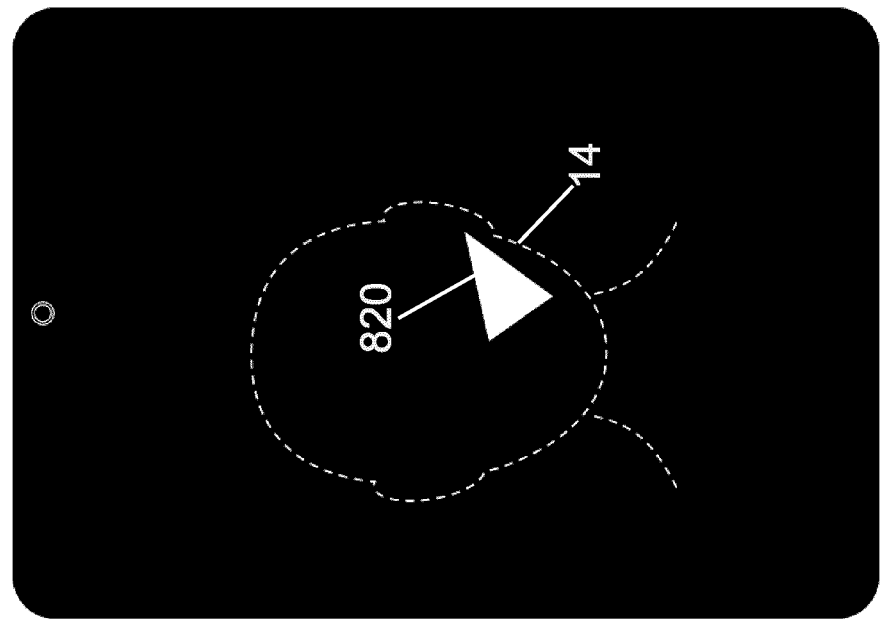
FIG. 8D illustrates the display overlay realized by the blurred effect element of FIG. 8A to FIG. 8C as perceived by the user.

In more detail, FIG. 8A illustrates a first status in which the blurred effect element 810 is at a first position along the determined motion trajectory 812, FIG. 8B illustrates a second status in which the blurred effect element 810 is at a second position along the determined motion trajectory 812, and FIG. 8C illustrates a third status in which the blurred effect element 810 is at a third position along the determined motion trajectory 812. In this example, the motion trajectory 812 is a looping trajectory such that the blurred effect element 810 can be displayed continuously in the motion trajectory at the display unit until the control unit receives further instructions. The motion of the blurred effect element 810 allows more precise guidance to be provided to the user at the mirror assembly for example when performing a personal care activity, without triggering the user to refocus between displayed information and their own reflective image 14. The animation of the display overlay as realized by the moving blurred effect element 810 in FIG. 8A to FIG. 8C would be readily interpreted by a human observer (e.g. the user) as a clearly defined boundary or region that is merged with the reflective image of the user's face in the field of view as a single image, and the display overlay 820 as perceived by the user is illustrated in FIG. 8D. This is in contrast to a non-moving display overlay 822 having a blur region as demonstrated in FIG. 8E.

Although it is described above that the motion trajectory 812 follows a triangular shape, it will be appreciated that in alternative embodiments the determined motion trajectory may follow different shapes depending on a part of the face of the user to be highlighted. For example, the determined motion trajectory may follow an oval shape if the forehead of the user is to be highlighted. The particular shape followed by the motion trajectory may be determined by the control unit of the mirror assembly or received as a user input via a user interface at the mirror assembly.

There is thus provided an improved mirror assembly and a method for displaying at least one of a visual element and a blurred effect element which overcome the existing problems.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines, and may be structured as an object-oriented program with classes. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mirror assembly comprising:
 a reflective portion configured to reflect incident light, wherein the reflective portion provides a reflective image of a user;
 a display configured to display a visual element; and
 a control unit is configured to:
  receive instruction to display the visual element on the display overlapping at least a portion of the reflective image of the user;
  determine, based on the received instruction, a blur region for the visual element based on an angle of blur and a first distance between the user and a plane of the mirror assembly, wherein the blur region corresponds to an area of perceived optical blur that would be incurred by the user based on a difference between the first distance and a perceived second distance, wherein the perceived second distance is between the user and the reflective image of the user beyond the plane of the mirror assembly as perceived by the user;
  adjust the blur region to have a size larger than the area of perceived optical blur that would be incurred by the user, so as to reduce or suppress a propensity of user's vision to seek focus; and
  control the display to display the visual element with a defocus blur in the adjusted blur region at the larger size in a field of view of the user.

2. The mirror assembly according to claim 1, wherein the control unit is further configured to receive a pupil diameter of the user, and to determine the angle of blur for the blur region based on the received pupil diameter of the user, the first distance and the perceived second distance.

3. The mirror assembly according to claim 1, further comprising a distance sensor unit configured to detect the first distance between the user and the plane of the mirror assembly.

4. The mirror assembly according to claim 1, wherein the control unit is further configured to determine the blur region for the visual element based on an ambient lighting condition.

5. The mirror assembly according to claim 1, wherein the reflective image of the user comprises a reflective image of a face of the user, and
 wherein the control unit is further configured to:
  determine whether the visual element is to be displayed at an area at the display corresponding to the reflective image of the face of the user at the reflective portion; and
  control the display to display the visual element with the adjusted blur region only when the visual element is determined to be displayed at the area corresponding to the reflective image of the face of the user.

6. The mirror assembly according to claim 5, further comprising a location sensor unit configured to determine a location of the user relative to the mirror assembly, wherein the control unit is further configured to determine the area at the display corresponding to the reflective image of the face of the user based on the determined location of the user relative to the mirror assembly.

7. The mirror assembly according to claim 5, further comprising an orientation sensor unit configured to detect an orientation of a head of the user, wherein the control unit is further configured to determine the area at the display corresponding to the reflective image of the face of the user based on the orientation of the head of the user.

8. A method for displaying a visual element at a display of a mirror assembly, together with a reflective image of a user, the method comprising:
 receiving instruction to display the visual element on the display overlapping at least a portion of the reflective image of the user;
 determining, based on the received instruction, a blur region for the visual element based on an angle of blur and a first distance between the user and a plane of the mirror assembly, the blur region corresponding to an area of perceived optical blur that would be incurred by the user based on a difference between the first distance and a perceived second distance, wherein the perceived second distance is between the user and the reflective image of the user beyond the plane of the mirror assembly as perceived by the user;
 adjusting the blur region to have a size larger than the area of perceived optical blur that would be incurred by the user, so as to reduce or suppress a propensity of user's vision to seek focus; and
 controlling the display to display the visual element with a defocus blur in the adjusted blur region at the larger size in a field of view of the user.

9. The method according to claim 8, further comprising receiving a pupil diameter of the user, and determining the angle of blur for the blur region for the visual element based on the received pupil diameter of the user, the first distance and the second distance.

10. The method according to claim 8, wherein the blur region for the visual element is determined based on an ambient lighting condition.

11. The method according to claim 8, wherein the reflective image of the user comprises a reflective image of a face of the user, and
 determining whether the visual element is to be displayed at an area at the display corresponding to the reflective image of the face of the user; and
 displaying the visual element with the adjusted blur region only when the visual element is determined to be displayed at the area corresponding to the reflective image of the face of the user.

12. The method according to claim 11, further comprising:
    sensing a location of the user relative to the mirror assembly; and
    determining the area at the display corresponding to the reflective image of the face of the user based on the sensed location of the user relative to the mirror assembly.

13. The method according to claim 11, further comprising:
    detecting an orientation of a head of the user; and
    determining the area at the display corresponding to the reflective image of the face of the user based on the detected orientation of the head of the user.

14. A non-transitory computer readable medium storing computer readable code for displaying a visual element at a display of a mirror assembly, together with a reflective image of a user, wherein on execution by a computer or processor, the computer readable code causes the computer or processor to:
    receive instruction to display the visual element on the display overlapping at least a portion of the reflective image of the user;
    determine, based on the received instruction, a blur region for the visual element based on an angle of blur and a first distance between the user and a plane of the mirror assembly, the blur region corresponding to an area of perceived optical blur that would be incurred by the user based on a difference between the first distance and a perceived second distance, wherein the perceived second distance is between the user and the reflective image of the user beyond the plane of the mirror assembly as perceived by the user;
    adjust the blur region to have a size larger than the area of perceived optical blur that would be incurred by the user, so as to reduce or suppress a propensity of user's vision to seek focus; and
    control the display to display the visual element with a defocus blur in the adjusted blur region at the larger size in a field of view of the user.

15. The non-transitory computer readable medium according to claim 14, wherein the computer readable code further cause the computer or processor to receive a pupil diameter of the user, and to determine the angle of blur for the blur region based on the received pupil diameter of the user, the first distance and the perceived second distance.

* * * * *